United States Patent [19]
Deibel

[11] 3,739,450
[45] June 19, 1973

[54] WORKPIECE MAGAZINE

[75] Inventor: Erwin Deibel, Rastatt, Germany

[73] Assignee: Maschinenfabrik Lorenz Aktiengesellschaft, Ettlingen/Baden, Germany

[22] Filed: Aug. 25, 1971

[21] Appl. No.: 174,644

[30] Foreign Application Priority Data
Sept. 4, 1970  Germany.................. G 70 32 993.0

[52] U.S. Cl............................................. 29/211 R
[51] Int. Cl.............................................. B23q 7/10
[58] Field of Search.................... 29/211 R, 211 D, 29/208 R, 208 D

[56] References Cited
UNITED STATES PATENTS
2,959,846  11/1960  Ide................................... 29/211 R

*Primary Examiner*—Thomas H. Eager
*Attorney*—John J. McGlew and Alfred E. Page

[57] ABSTRACT

A workpiece magazine, for storing a relatively large number of workpieces before and after they are machined on an adjacent machine tool, has a vertically displaceable storage drum rotatable past a feeding arrangement for the machine tool. The workpieces are arranged in groups on intermediate floors in separate cassettes, one above the other, and the cassettes can be interchangeably suspended on the outer surface of the drum. The drum has two vertically spaced coaxial annular elements united by perpendicular struts, and the elements have holes spaced around their peripheries receiving pins on the ends of the cassettes. The upper element is constructed as an internal ring gear engageable with the pinion of a positioning motor, and the lower ring element forms a roller guide for an oil drip tray which is suspended non-rotatably therefrom. The cassettes are in the form of shaped angle sheet metal funnels or shells having apertures through which a workpiece injector may project into the cassette to eject a workpiece from a floor in the cassette.

8 Claims, 4 Drawing Figures

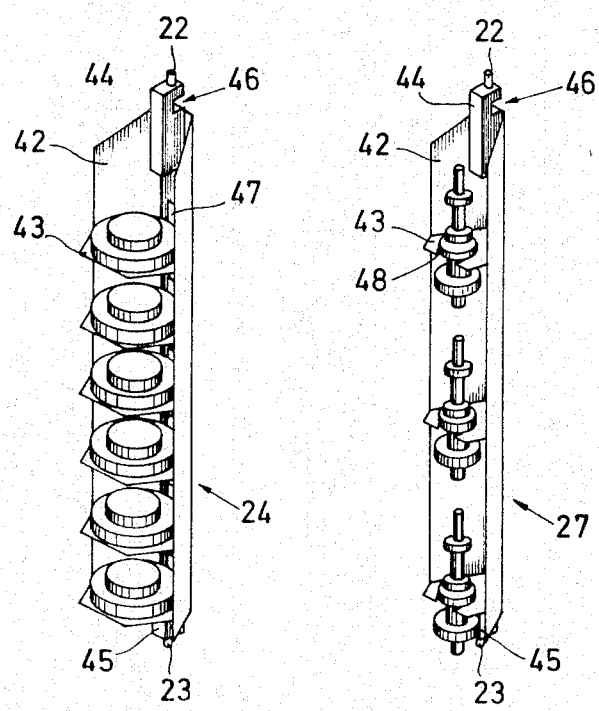

WORKPIECE MAGAZINE

FIELD OF THE INVENTION

This invention relates to workpiece magazines for storing a relatively large number of disc or shaft-shaped workpieces before and after the workpieces are worked on an adjacent machine tool, and more particularly relates to such a workpiece magazine in which the workpieces are stored in superimposed relation in cassettes interchangeably suspended on the outer surface of a vertically displaceable storage drum rotatable past a feeding arrangement for a machine tool.

BACKGROUND OF THE INVENTION

In the initial stage of rationalization and automation of production, particularly in the construction of motor vehicles, magazining and feeding apparatus was used including workpiece magazines having a storage capacity of approximately 1 to 2 hours. While, it was thus possible for a man to serve a plurality of machines, he nevertheless had to stay constantly by the relevant group of machines so as to be able to remove machined workpieces from the individual magazines and restock the magazines with non-machined workpieces.

With the continuing perfection of rationalization and automation, it then became necessary to develop workpiece magazines having a storage capacity sufficient for one working shift, and this was attained by various constructions. For example, the conveyor chains, which pass around the workpiece stand on a hobbing machine and by which workpieces are carried past the center of the chucking device, were lengthened so that their storage capacity was sufficient for one working shift. However, the floor area required by the associated machine tool, and hence its proportion of the workshop space, were uneconomically increased. Furthermore, such a construction required a corresponding design of the conveyor chain guideway, which thus became bulky and exerted a tipping moment on the workpiece slide of the hobbing machine.

With the feeding and removal of workpieces, the workpiece stand, with the conveyor chain for the workpieces, and the workpiece slide, had to be moved horizontally from the tool, for example a hobbing cutter, and back again. By virtue of the lengthening of the conveyor chain along with its guideway, the mass of such a workpiece magazine which had to be moved became greater, and this had an unfavorable effect on the horizontal movement thereof.

In the meantime, there became known drum storage means, wherein disc-shaped workpieces are accommodated in tubes whose inside diameter corresponds to the outside diameter of the workpieces, or wherein workpieces having a central aperture are threaded onto rods whose outside diameter corresponds to the inside diameter of the workpieces. In this case, if other workpieces of different dimensions are to be machined, on the associated machine tool, the pipes or rods serving to carry the disc-shaped workpieces have to be changed. According to the number of different sizes of workpieces designed for working by the machine, the corresponding number of sets of tubes or rods must be available and kept in stock. This requires long retooling times and additional storage space in the workshop.

Furthermore, with such drum storage means which are not vertically adjustable, during feeding and removal of the workpieces, a correspondingly high workpiece column must always be moved vertically within the tube, in order to bring the workpieces to the corresponding height for loading. Furthermore, when feeding the workpieces out of the tube, the next successive tube or rod shaped carrier, at the interval of one space, must be empty to accommodate the completely machined workpieces. Consequently, during the feeding and removal operation, the drum storage means always must execute a partial step to and fro until the tube or rod with the unfinished workpieces is empty and the next carrier is filled. It is only then that the drum storage means is moved on by one indexing step, and the supply and removal process is resumed in the above-described manner.

SUMMARY OF THE INVENTION

The objective of the invention is to avoid the disadvantages mentioned above in a workpiece magazine including a vertically displaceable storage drum rotatable past a feeding arrangement for a machine tool. In accordance with the invention, this problem is solved in that the intermediate floors are located on separate cassettes, each being designed for a group of workpieces stored one above another, and with the cassettes being adapted to be interchangeably suspended on the periphery or shell of the storage drum.

In an advantageous development of the invention, the storage drum is formed by two annular ring elements interconnected by perpendicular struts, the ring elements having, distributed along their peripheries, holes into which the cassettes can be hooked by studs located at their ends. Advantageously, the upper ring element is constructed as a ring gear engageable with a pinion on the shaft of a positioning motor, the motor being mounted on a vertically movable circular plate on which the storage drum is rotatably mounted. Preferably, the positioning motor is a geared braking motor. Additionally, with this construction, the lower ring element advantageously may be a roller guide for a non-rotatable oil trap suspended thereon to receive the cooling oil which drips off the machined workpieces.

In accordance with another feature of the invention, each cassette comprises a funnel-shaped angled-edge sheet metal shell in whose mouth intermediate floors are welded. Between the floors, the sheet metal shell has, in its crown zone, apertures for passage of an ejector located, in a known manner, inside the drum. In accordance with the nature of the workpieces which are to be stored in the cassettes, the intermediate floors may be without apertures or may be provided with apertures which, to facilitate the feeding in and removal of workpieces, are then expediently constructed in the form of cutouts which are open toward the free edge of the floor.

An object of the invention is to provide an improved workpiece magazine for storing a relatively large number of disc-shaped or shaft-shaped workpieces prior to and following their working on an adjacent machine tool.

Another object of the invention is to provide such a workpiece magazine for storing the workpieces prior to and following their working on a gear hobbing or slotting machine.

A further object of the invention is to provide such a magazine with a vertically displaceable storage drum arranged for rotation past a feed arrangement for the machine tool.

Another object of the invention is to provide such a workpiece magazine in which the workpieces are distributed on the periphery of the storage drum on intermediate floors and in groups one above the other.

For an understanding of the principles of the invention, reference is made to the following description of typical embodiments thereof as illustrated in the accompanying drawing.

BRIEF DESCRIPTION OF THE DRAWING

In the drawing:

FIGS. 3 and 4 are perspective views II of two different suspendable cassettes, for disc-shaped workpieces and shaft-shaped workpieces, respectively.

DESCRIPTION OF THE PREFERRED EMBODIMENTS

Figure 1:
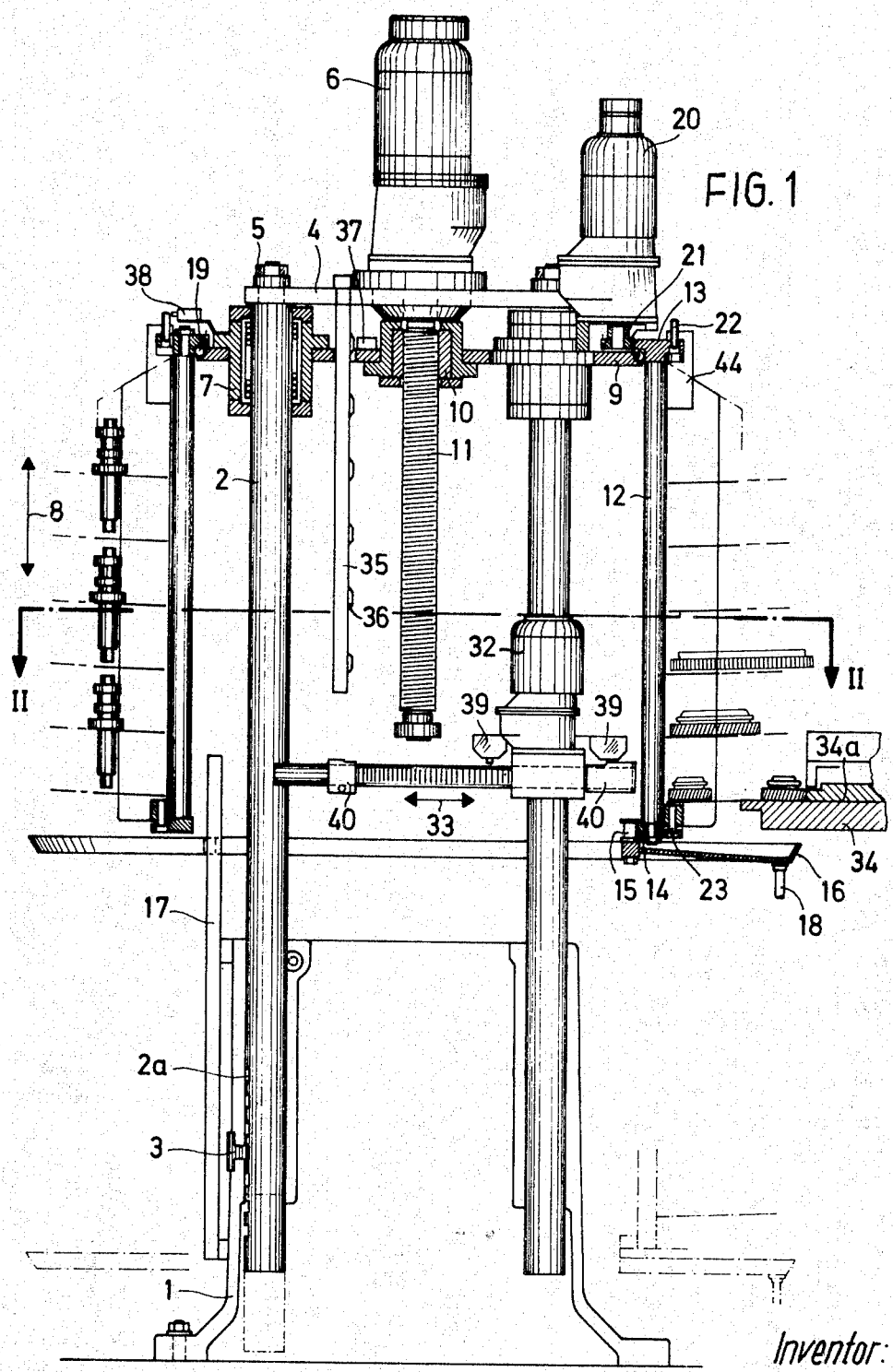
FIG. 1 is an axial sectional view of a workpiece magazine, embodying the invention, and taken along the line I—I of FIG. 2.

Referring to FIG. 1, the basic frame of the workpiece magazine comprises a base 1 in which three columns 2, located at the apices of an equilateral triangle, are mounted for vertical adjustment. The height position of columns 2, necessary in each case with respect to a loading plane 34a, is adjusted by means of grooves 2a in at least one of the columns and into which a key piece 3 engages. Base 1 is anchored to the workshop floor at an appropriate distance from a machine tool (not shown). A cover plate 4 interconnects the three columns 2 at their top ends, and is bolted against the column ends by means of nuts 5. In the apertured center of cover plate 4 there is located a flanged-on geared braking motor 6. Respective ball bearing mounted rotating bushes 7 are guided on each column 2 for vertical displacement in the direction of the double-headed arrow 8. These rotating bushes 7 are bolted to a circular plate 9 which, in axial alignment with motor 6, is provided with a fixed nut 10 in which there is threadedly engaged a screw spindle 11 driven by motor 6.

The storage drum carried by the basic frame comprises a number of struts 12 of circular cross-section material, which are interconnected at their upper ends by an internal gear rim 13 and at their bottom ends by a supporting ring 14. An oil drip tray 16 is guided on rollers 15 and suspended from ring 14, this tray being secured against rotation by a key strip 17 bolted to base 1. This is necessary in order to provide a fixed oil drain 18 through which the cooling oil or the like, which drips from the machined workpieces, can flow out of oil drip tray 16. The storage drum, comprising the annular elements 13 and 14 and the struts 12, is mounted by means of balls 19 for rolling-friction rotation on the periphery of circular plate 9, which latter is constructed as a ball race. Circular plate 9 furthermore supports a geared braking motor 20 having a driving pinion 21 on its output shaft meshing with the internal cut teeth of internal ring gear 13.

Figure 2:
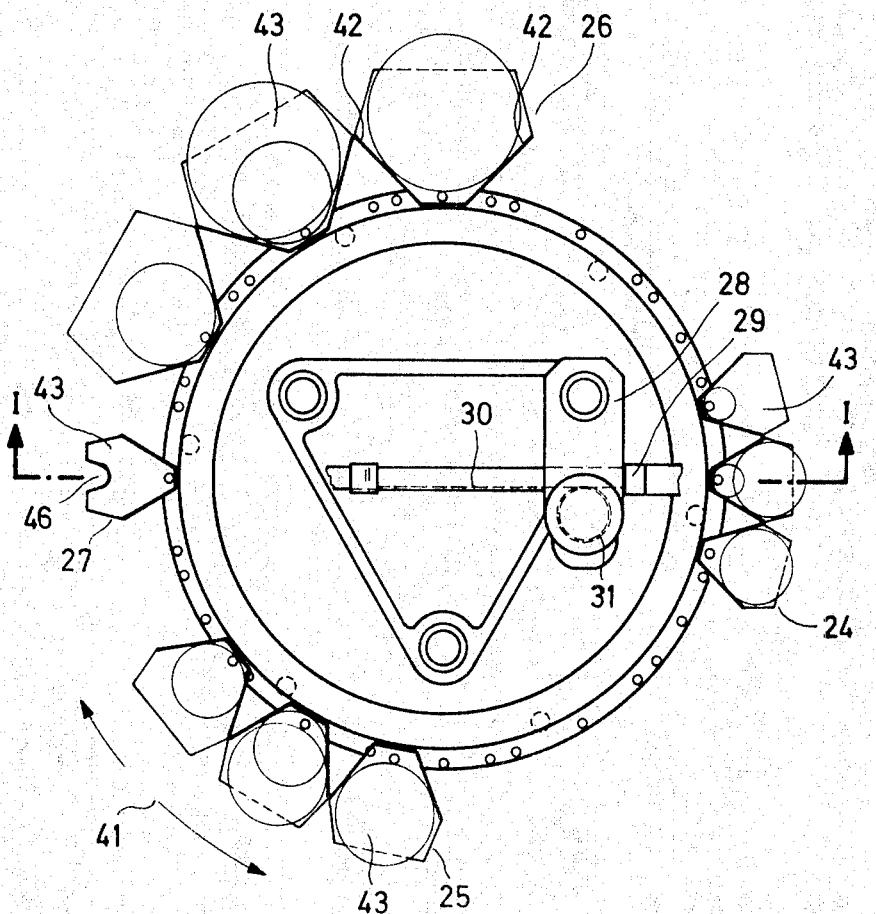
FIG. 2 is a horizontal sectional view through the workpiece magazine taken along the line II of FIG. 1.

Ring or annular parts 13 and 14 are formed, at definite spacings around their peripheries, with holes or apertures into which pin members 22 and 23, on the ends of cassettes 24, 25, 26, 27, shown in FIG. 2, are interchangeably suspended or hung. These cassettes are described in greater detail hereinafter. Cassettes 24, 25 and 26 are intended for disc-shaped workpieces of varying sizes, and cassettes 27 are intended for shaft-shaped workpieces.

An ejector device 28, including a push rod 29, is mounted on one of the columns 2. Push rod 29 carries a rack arrangement 30 meshing with a pinion 31 which is driven by a further geared braking motor 32, and rotation of which pinion moves push rod 29 in the direction of the double-headed arrow 33.

FIG. 1 further shows a conveyor apparatus which conveys, to the chucking point on the machine tool, workpieces ejected from the cassettes by ejecting means 28, and then feeds the finished workpieces back to the storage drum. This conveyor apparatus includes a turret plate 34 at the height of the mentioned loading plane 34a on which, like the ejector device constituted by motor 32, pinion 31 and push rod 29, an apparatus for returning the completed workpieces to the cassettes of the storage drum can be provided.

The geared braking motors are switched on in the rhythm of an automatically cycling switching program for the magazining, feeding and removing, as well as the working, operations of the workpiece magazine or machine tool, and are switched off by appropriate limit switches and switching cams on the workpiece magazine. For this purpose, and for the lifting and lowering movement in the direction of the double-headed arrow 8 by geared braking motor 6 through screw spindle 11 and nut 10, a switching strip 35 is provided, as shown in FIG. 1, and is connected to cover plate 4 and carries switching cams 36. Cams 36 cooperate with a limit switch 37 which switches off motor 6 after each partial vertical displacement step.

To effect stepwise rotation in a peripheral direction in accordance with the double-headed arrow 41 of FIG. 2, and which is produced by geared braking motor 20 through pinion 21 and internal ring gear 13, a limit switch 38 is provided and is contacted by pin members 22, thereby to switch motor 20 off after each angular stepping of the drum. For the movement of push rod 29, which is driven by geared braking motor 22 through rack 30 and pinion 31, limit switches 39 are provided and are actuated by cams 40. The above-mentioned return conveyor apparatus on revolving plate or turret plate 34, operates in the same way as does ejector device 28.

FIG. 3 shows one of the cassettes 24, 25 or 26, for example the cassette 24, for disc-shaped workpieces, while FIG. 4 shows cassette 27 for shaft-shaped workpieces. Each cassette 24 or 27, as naturally also cassettes 25 and 26 shown in FIG. 2, consists of a funnel-shaped angled edged sheet metal shell 42 in which intermediate floors 43 are welded. Secured to the ends of sheet metal shell 42, for example by welding, are bearing parts 44 and 45. Upper bearing part 44 has a mouth-shaped cutout 46 into which suspension pin 22 extends from above, this pin being pressed into a corresponding bore in bearing part 44. Suspension pin member 23 of bottom bearing part 45 projects downwardly out of this bottom bearing part and is likewise pressed into a bore therein.

The rear wall of each cassette, which is situated in the crown zone of the sheet metal 24, is provided, between intermediate floors 43, with apertures 47 for passage of push rod 29 of ejector means 28. In the case of the cassettes 27 for shaft-shaped workpieces, intermediate floors 43 have cutouts 48 open toward both edges and into which the workpieces can be hung as illustrated in FIG. 2.

The described workpiece magazine operates in a manner which will now be set forth. A non-machined workpiece is pushed, by push rod 29 of ejector device 28, out of the cassette chamber located in front of push rod 29 and into an empty housing in revolving plate 34. Plate 34 thereupon performs a partial step in plane 34a, and brings a machined workpiece in front of the now empty cassette chamber. Simultaneously, push rod 29 travels back in accordance with the rhythm of the switching program. The return conveying means on plate 34 now pushes the machined workpiece into the empty cassette chamber, and thereupon the storage drum performs a partial step movement in an angular direction, as indicated by arrow 41, so that once again a non-machined workpiece arrives in front of push rod 29 of ejector device 28, which is now opposite the empty housing and the revolving plate 34, and the aforementioned process is repeated.

After one complete rotation of the storage drum, the drum is raised or lowered by a partial step in the direction of the double-headed arrow 8. In this way, the entire workpiece magazine contents will be fed to the machine tool for machining. By suitable means, which have not been illustrated, it is possible to prevent an already machined workpiece from being fed again to the machine tool. While workpieces are being continuously fed to the machine tool, in the described manner, for machining, and are removed therefrom again, the operator can take the finished workpieces from the workpiece magazine and supply non-machined workpieces thereto. During this work, he is not bound to any definite time or any definite sequence, and need only ensure that the workpiece magazine does not run empty.

The application of the magazine according to the invention is not confined solely to machine tools. Alternatively, the magazine can be used, for example, in conjunction with packaging machines and possibly also to serve as an automatic vending unit, in which cases it needs to be controlled accordingly.

While specific embodiments of the invention have been shown and described in detail to illustrate the application of the principles of the invention, it will be understood that the invention may be embodied otherwise without departing from such principles.

What is claimed is:

1. In a workpiece magazine, for storing a relatively large number of disc-shaped or shaft-shaped workpieces before and after they are machined on an adjacent machine tool, such as a gear hobbing machine or a slotting machine, the magazine having a vertically displaceable storage drum rotatable past a feeding arrangement for a machine tool, with the workpieces being distributed around the drum periphery on intermediate floors in groups and one above another: the improvement comprising, in combination, said intermediate floors being provided in separate cassettes each including a plurality of said intermediate floors in vertically spaced relation to hold a respective group of superimposed workpieces each stored on a respective intermediate floor; said drum and said cassettes being cooperatively constructed for interchangeable suspension of said cassettes on the outer surface of said drum.

2. In a workpiece magazine, for storing a relatively large number of disc-shaped or shaft-shaped workpieces before and after they are machined on an adjacent machine tool, such as a gear hobbing machine or a slotting machine, the magazine having a vertically displaceable storage drum rotatable past a feeding arrangement for a machine tool, with the workpieces being distributed around the drum periphery on intermediate floors in groups and one above another: the improvement comprising, in combination, separate cassettes each mounting plural said intermediate floors and each arranged to hold a group of superimposed stored workpieces; said drum and said cassettes being cooperatively constructed for interchangeable suspension of said cassettes on the outer surface of said drum; said storage drum being formed by two spaced annular elements interconnected by perpendicular struts; said annular elements having, distributed on their periphery, holes into which studs on the ends of said cassettes can be inserted.

3. In a workpiece magazine, the improvement claimed in claim 2, in which said upper ring element is constructed as an internal ring gear; a positioning motor mounted on a vertically displaceable circular plate; means mounting said storage drum on said circular plate; said motor having a drive shaft carrying a pinion engageable with said internal ring gear.

4. In a workpiece magazine, the improvement claimed in claim 3, in which said positioning motor is a geared braking motor.

5. In a workpiece magazine, the improvement claimed in claim 3, in which said lower ring element forms a roller guide for an oil drip tray which is suspended therefrom and fixed against rotation.

6. In a workpiece magazine, the improvement claimed in claim 4, in which said lower ring element forms a roller guide for an oil drip tray which is suspended therefrom and fixed against rotation.

7. In a workpiece magazine, for storing a relatively large number of disc-shaped or shaft-shaped workpieces before and after they are machined on an adjacent machine tool, such as a gear hobbing machine or a slotting machine, the magazine having a vertically displaceable storage drum rotatable past a feeding arrangement for a machine tool, with the workpieces being distributed around the drum periphery on intermediate floors in groups and one above another: the improvement comprising, in combination, separate cassettes each mounting plural and intermediate floors and each arranged to hold a group of superimposed stored workpieces; said drum and said cassettes being cooperatively constructed for interchangeable suspension of said cassettes on the outer surface of said drum; each cassette being a funnel-shaped angled edged sheet metal shell; said shell having a crown area formed with apertures to receive a push rod of an ejector mechanism; each cassette having welded therein, between said apertures, intermediate floors for supporting workpieces.

8. In a workpiece magazine, the improvement claimed in claim 11, in which said intermediate floors have cutouts open toward the free edge of the associated intermediate floor.

* * * * *